US008527454B2

(12) United States Patent
Oza

(10) Patent No.: US 8,527,454 B2
(45) Date of Patent: Sep. 3, 2013

(54) DATA REPLICATION USING A SHARED RESOURCE

(75) Inventor: Dhairesh Oza, Provo, UT (US)

(73) Assignee: EMC Corporation, Hopkinton, MA (US)

( * ) Notice: Subject to any disclaimer, the term of this patent is extended or adjusted under 35 U.S.C. 154(b) by 846 days.

(21) Appl. No.: 11/846,704

(22) Filed: Aug. 29, 2007

(65) Prior Publication Data
US 2009/0063486 A1 Mar. 5, 2009

(51) Int. Cl.
*G06F 17/30* (2006.01)

(52) U.S. Cl.
USPC .......................................... 707/610; 707/674

(58) Field of Classification Search
None
See application file for complete search history.

(56) References Cited

U.S. PATENT DOCUMENTS

| 5,247,673 | A | | 9/1993 | Costa et al. |
| 5,274,789 | A | | 12/1993 | Costa et al. |
| 5,418,966 | A | * | 5/1995 | Madduri ........................ 710/200 |
| 5,463,733 | A | * | 10/1995 | Forman et al. ................... 714/10 |
| 5,734,902 | A | | 3/1998 | Atkins et al. |
| 6,823,349 | B1 | * | 11/2004 | Taylor et al. ................... 707/204 |
| 7,617,369 | B1 | * | 11/2009 | Bezbaruah et al. ............ 711/162 |
| 7,631,009 | B1 | * | 12/2009 | Patel et al. .............................. 1/1 |
| 2003/0033487 | A1 | * | 2/2003 | Pfister et al. ................... 711/144 |
| 2003/0172106 | A1 | * | 9/2003 | Highleyman et al. ......... 709/106 |
| 2003/0187991 | A1 | * | 10/2003 | Lin et al. ........................ 709/227 |
| 2004/0128470 | A1 | * | 7/2004 | Hetzler et al. ................. 711/209 |
| 2004/0215640 | A1 | * | 10/2004 | Bamford et al. ............... 707/100 |
| 2006/0020738 | A1 | | 1/2006 | Hepkin et al. |
| 2006/0161606 | A1 | | 7/2006 | Biswal et al. |
| 2008/0235245 | A1 | * | 9/2008 | Huras et al. ....................... 707/10 |

OTHER PUBLICATIONS

"Veritas Volume Replicator Option by Symantec: A Guide to Understanding Volume Replicator", *Symentec—White Paper—Enterprise Solutions*, (2006),1-28.
"What is a shadow copy?", http://www.microsoft.com/technet/prodtechnol/dpm/proddocs/99934b84-9157-4e3f-9288-633a94d8406d.mspx?mfr=true, (2005).
"What is DRBD", http://www.drbd.org/, (Downloaded Aug. 27, 2007).
Chapman, D. et al., "SnapMirror: Best Practices Guide", *NetApp—TR-3446*, (Aug. 2007),1-61.

* cited by examiner

*Primary Examiner* — S Hasan
(74) *Attorney, Agent, or Firm* — Barry N. Young

(57) ABSTRACT

Techniques are presented for data replication. Two or more nodes are engaged in data replication with one another. When a node acquires a write lock, the write is processed to a local disk associated with the node and communicated to a shared disk. During recovery of a particular node following a failure, the shared disk is accessed to assist in synchronizing that particular node.

23 Claims, 3 Drawing Sheets

DATA REPLICATION USING A SHARED RESOURCE

BACKGROUND

Data and information are rapidly becoming the life blood of enterprises. Transactions with customers, operational data, financial data, corporate intelligence data; in fact, all types of information are now captured, indexed, stored, and mined by enterprises in today's highly competitive and world economy.

Since information is vital to the enterprise, it is often made available twenty-four hours a day, seven days a week, and three hundred sixty-five days a year. To achieve such a feat, the enterprises have to implement a variety of data replication, data backup, and data versioning techniques against their data warehouses.

For example, an enterprise may dynamically replicate the state of its data for a particular volume with an entirely different and remote volume. If something should happen to the particular volume, a user can have uninterrupted access to the remote volume with little noticeable or detectable loss of service from the viewpoint of the user. Additionally, both volumes can be independently accessed by different sets of users. Thus, replication permits access in the event of failure and can help alleviate load for any particular volume.

Today, most approaches utilize an approach where the volumes that are synchronized with one another directly and exclusively communicate with one another to perform replication with one another. This can lead to complex synchronization when more than two volumes are being replicated and multiple failures occur. Additionally, it places the management and communication associated with recovery from failures on the nodes themselves, which can degrade performance in servicing a user when a failing node needs resynchronized.

As a result, there is a need for improved data replication techniques.

SUMMARY

In various embodiments, techniques are provided for data replication using a shared resource. More particularly and in an embodiment, a method is provided for data replication. A write lock is acquired on a first node and blocks associated with the write lock are writing to one or more local disks of the first node. Simultaneously, the blocks associated with the write lock are written to a shared disk over a network connection. The shared disk is shared with a second node, and the first node and second node are replicated with one another. Next, the write lock is released after the writing to the one or more local disks and after the writing to the shared disk complete.

DETAILED DESCRIPTION

A "node" refers to a machine or collection of machines within a local processing environment. A "machine" refers to a processing device, such as but not limited to a computer, a phone, a peripheral device, a television (TV), a set-top-box (STB), a personal digital assistant (PDA), etc.

Any particular node processes within a local processing environment, which may include a local area network (LAN) and that particular node has access within that local processing environment to one or more local storage disks or devices.

Multiple nodes from multiple processing environments communicate with one another to replicate their local disks with one another. Each local disk for a particular node is a replica of another local disk for a different node. The nodes communicate over a wide area network (WAN), such as but not limited to the Internet.

In addition, and as is discussed in greater detail herein and below, each of the nodes communicate with an independent shared resource. The "shared resource" is a shared storage device or disk that is accessible over the WAN to each of the nodes. In an embodiment, the shared disk is on a node that is independent of the other nodes involved in data replication.

A variety of architectures or technologies can be used to access the shared disk, such as but not limited to a Storage Area Network (SAN), Internet Small Computer System Interface (iSCSI), Network File System (NFS), etc.

According to an embodiment, the techniques presented herein may be implemented within Novell products distributed by Novell, Inc. of Provo, Utah; such as but not limited to Novell's Distributed File Services (DFS). Of course it is to be understood that any network architecture, device, proxy, operating system (OS), or product may be enhanced to utilize and deploy the techniques presented herein and below.

It is within this context that embodiments of the present invention are discussed with reference to the FIGS. 1-4.

Figure 1:
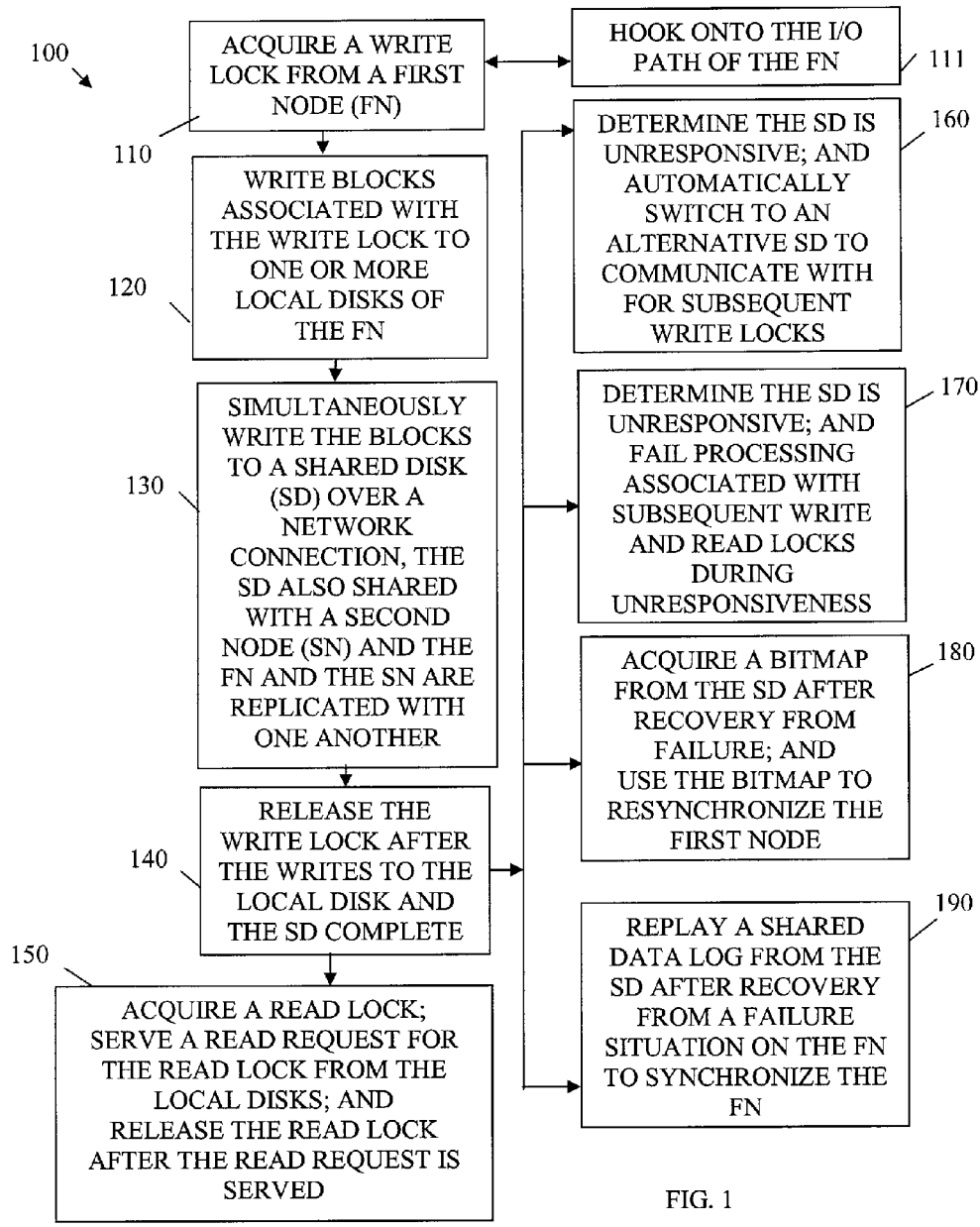
FIG. 1 is a diagram of a method for data replication using a shared resource, according to an example embodiment.

FIG. 1 is a diagram of a method 100 for data replication using a shared resource, according to an example embodiment. The method 100 (hereinafter "replication service") is implemented in a machine-accessible and machine-readable medium and is accessible over a network. The network may be wired, wireless, or a combination of wired and wireless. The replication service processes on a node that is engaged in replication with at least one other different node of the network.

It is noted, that each node involved in replicating its local disks can include a processing instances of the replication service. In this manner, each node involved in replication performs the processing discussed herein with reference to the FIG. 1.

At 110, the replication service acquires a write lock from a first node. In an embodiment, at 111, this is achieved by hooking onto the Input/Output I/O path of the first node so that I/O is detected as it is being requested on the first node and before it actually processes. The write lock is associated with a write request that includes data and one or more blocks. The write requests are to be performed on one or more local disks of the first node.

At 120, the replication service writes the blocks associated with the write lock to the one or more local disks of the first node. Simultaneously, at 130, the replication service writes the blocks or messages associated with the write blocks to a shared disk over a network connection. By messages it is meant that the details of the write or other control information identifying the replication service and its actions are recorded in the shared disk.

The shared disk is also shared with at least one other second node over the network connection. Furthermore, the first node and the second node are dynamically and actively being replicated and synchronized with one another. This means the first node's local disks are replicas of the second node's local disks.

At 130, the replication service releases the write lock after the blocks are written to the one or more local disks of the first node and after the blocks or messages are written to the shared disk. That is, after writes to both the local disks and the shared disk complete, the write lock is released by the replication service.

In an embodiment, at 150, the replication service acquires a read lock associated with a read request to service data. In response to this, the replication service serves the read request from the local disks of the first node and immediately releases the read lock.

It can be seen from the above processing that a single write results in N+1 writes, where N is an Integer representing the number of nodes being replicated (in the present example N=2 for the first and second nodes). The addition of one is for the extra write that is done to the shared disk. This also results in N−1 reads, since each of the remaining nodes not initially processing the write have to read the write that occurred from the shared disk and write the blocks of data associated with the write to their local disks.

However, as is shown at 150, the reads are performed locally on the node having the read lock from their local disks. Therefore, reads are processed rapidly and served efficiently with little overhead involved. So, in situations where shared data is read more often then it is written or modified, the above scenario creates an optimal replication processing environment.

According to an embodiment, at 160, the replication service determines that the shared disk becomes unresponsive. In response, the replication service automatically and dynamically switches to an alternative shared disk to communicate with for subsequent write locks involved in the replication process. A third-party service can dynamically identify the alternative shared disk to communicate with. Alternatively, configuration, policy, or profile information can provide the identity of the alternative shared disk. The alternative shared disk may itself be replicated with the failed shared disk.

In a different embodiment, at 170, the replication service determines that the shared disk becomes unresponsive. In response, the replication service automatically fails processing associated with subsequent write and read locks during the period of unresponsiveness.

In an embodiment, at 180, the replication service acquires a bitmap from the shared disk after the first node has failed and starts up after a recovery. The bitmap identifies blocks that were modified during the period within which the first node was down. This can be done by setting each bit representing the local disks of the first node that were changed. When the first node comes back online, the replication service inspects the bitmap for set bits and acquires those blocks from the second node to update and re-synchronize itself with the second node.

In still another embodiment, at 190, the replication service replays a shared data log from the shared disk after the first node recovers from a failure situation on the first node to re-synchronize the first node with the second node. That is, the first node acquires the missing data blocks from the shared disk once it comes online following a failure situation.

Figure 2:
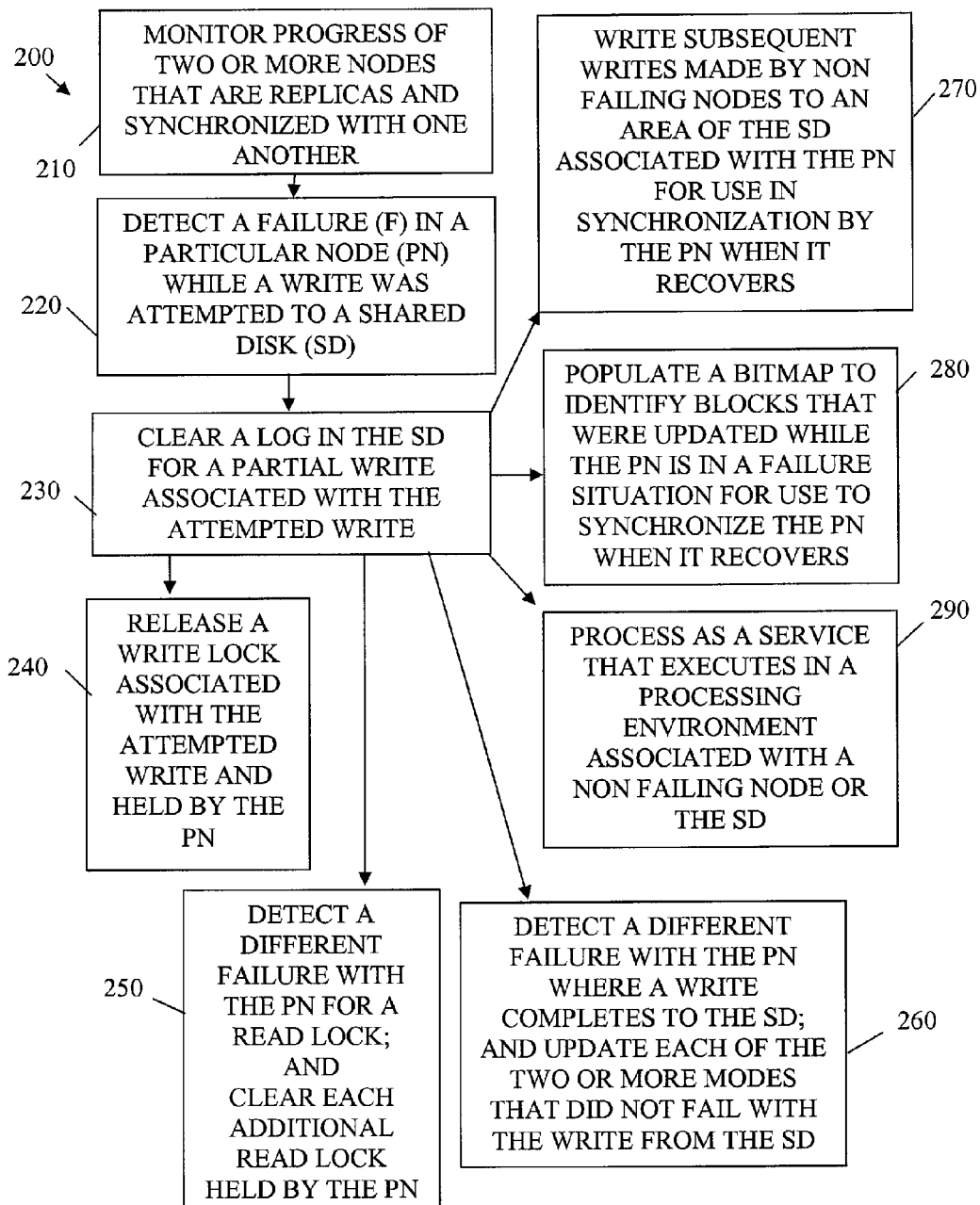
FIG. 2 is a diagram of a method for managing data replication failure situations, according to an example embodiment.

FIG. 2 is a diagram of a method 200 for managing data replication failure situations, according to an example embodiment. The method 200 (hereinafter "monitor service") is implemented in a machine-accessible and readable medium and is accessible over a network. The network may be wired, wireless, or a combination of wired and wireless.

The monitor service process on any node of the network. This means that the monitor service can process on a node that is actively engaged in replication or that the monitor service can process on a node associated with the shared disk. In some embodiments, the monitor service may also be duplicated similar to the replication process and may coordinate with other processing instances of itself on the network.

The replication service represented by the method 100 of the FIG. 1 demonstrates how a shared disk is used to manage multi-node replication of disks. An enhancement to that processing involves the use of a different service, namely the monitor service that provides a variety of administrative and management features discussed herein and below.

At 210, the monitor service actively and dynamically monitors the progress of two or more nodes that are replicas of one another and that are being synchronized with one another.

At some point, at 220, the monitor service detects a failure in a particular node (one of the two more nodes that are being replicated). The failure is detected while a write was being attempted to the shared disk but did not successfully complete processing on the shared disk.

In response to this failed write attempt, at 230, the monitor service clears a log in the shared disk associated with a partial write that never completed with the attempted write.

Next, at 240, the monitor service releases the write lock or clears it out. The write lock was associated with a write that the particular node was attempting to process before it failed or encountered a failure situation. That is, the write lock is pending and being held by the particular node (an outstanding and unprocessed write lock) when the failure is detected. This ensures that the particular node will know that the write failed when it recovers, since it will not see any indication of the write in the shared disk when it comes back online and it ensures that the other nodes being replicated will not hang or attempt to process a partial and incomplete write request.

In another failure situation, at 250, the monitor service detects a different failure associated with a particular node (again one of the two or more nodes being replicated with one another). In this different failure situation, the failing node had an unprocessed read lock associated with a pending read request when it failed. Here, the monitor service checks for any and all pending and unprocessed read locks on the failed node and clears each of them; so that the failed node will reprocess them or know that they failed when it comes back on line.

In still another failure situation, at 260, the monitor service detects yet another different type of failure situation. Here, the particular failing node fails after it successfully completes a write request and the shared disk has complete information regarding the write. In such a situation, each of the remaining and non failing nodes of the two or more nodes is updated with the successful write that occurred just before the particular node failed. This ensures each of the other nodes is synchronized with this write when the failed node recovers and comes back online.

During a failure, the monitor service can perform a variety of useful actions that will assist the particular failing node when it recovers and comes back on line.

For example, at 270, the monitor service writes all subsequent writes made by non failing nodes while the failing node is out of commission to an area of the shared disk associated with the particular failing node. This area is accessed by the failing node when it comes back online and the information is used to re-synchronize the failed node when it recovers.

In a different situation, at 280, the monitor service populates a bitmap to identify modified and changed blocks (associated with the failed node's local disks) when the failed node is offline. When the failed node comes online, it acquires the bitmap to determine which blocks of its local disks need updated. The data associated with the blocks can be acquired from one of the non-failing nodes or from a different area associated with the shared disk.

According to an embodiment, at 290, the entire processing associated with the monitor service can execute in a processing environment that is local to and associated with the shared disk. In another situation, the entire processing associated with the monitor service can execute in a processing environment that is local to and associated with any one of the non failing nodes that are being replicated with one another and a failed node.

Figure 3:
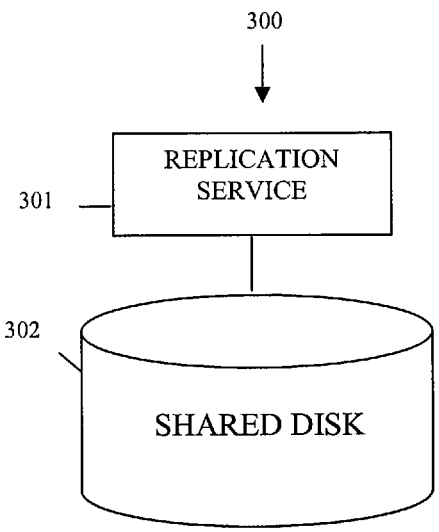
FIG. 3 is a diagram of a data replication system, according to an example embodiment.

FIG. 3 is a diagram of a data replication system 300, according to an example embodiment. The data replication system 300 is implemented in a machine-accessible and readable medium and is accessible over a network. The network may be wired, wireless, or a combination of wired and wireless. In an embodiment, the data replication system 300 implements, among other things, the process associated with the replication service represented by the method 100 of the FIG. 1.

The data replication system 300 includes a replication service 301 and a shared disk 302. Each of these and their interactions with one another will now be discussed in turn.

The replication service 301 is implemented in a machine-accessible and readable medium and is to process on a machine of the network, which is associated with a first node. Example processing of the replication service 301 was presented in detail above with reference to the method 100 of the FIG. 1.

The replication service 301 keeps a first local disk associated with the first node in synchronization with a third local disk associated with a third node. Again, the third node has its own processing instance of the replication service 301 and the two instances cooperate and communicate with one another. This is done by acquiring write locks and performing the writes for blocks of data against the first local disk and communicating the writes to the shared disk 302 and then releasing the write locks.

In an embodiment, the replication service 301 first communicates the writes to the shared disk 302 and waits for an indication that the third node has completed the writes before the writes are processed or performed against the first local disks. This can also be a processing parameter or option configured by an administrator.

In another case, the replication service 301 simultaneously performs the writes against the first local disk while communicating the writes to the shared disk 302.

According to an embodiment, the replication service 301 acquires a read lock and services data associated with a read request from the first local disk and then releases the read lock. This is entirely local and requires very little overhead to perform.

In some cases, the replication service 301 communicates the writes to a designated area of the shared disk 302 that is accessible to just the first node. This is discussed more completely below.

The shared disk 302 is implemented as a device accessible to the first node over a WAN network connection or the network. Additionally, the shared disk is locally accessible to a different machine associated with a second node.

The shared disk 302 is a block or network accessible device accessible to all nodes being replicated with one another. This can be a SAN, Logical Unit Number (LUN), iSCSI, NFS, Server Message Block (SMB), Network Control Program (NCP), etc.

In an embodiment, the shared disk 302 is structured to include at least three areas, a data log, lock data information, and administrative data. Other data and partitions can be achieved according to the needs of a particular enterprise. For example, the tracking and audit information that includes identity information for resources making write transactions can be retained.

In an embodiment, the shared disk 302 includes a designated partitioned or reserved area access to the first node and another different and designated partitioned area accessible to the third node. This permits the first node and the third node to simultaneously communicate information to the shared disk 302 without conflict and without delay.

The shared disk 302 provides the novel mechanism by which traditional replication offloads replication and failure services to a shared resource, namely the shared disk 302.

Figure 4:
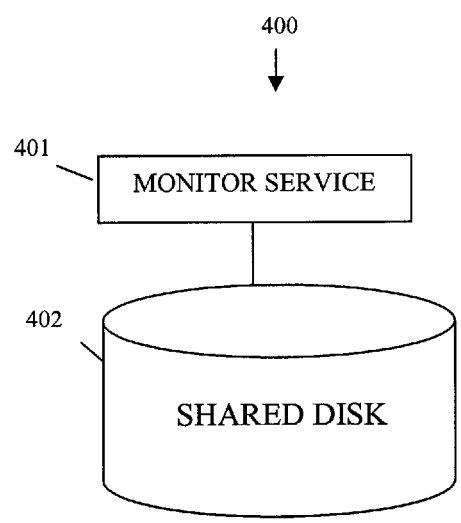
FIG. 4 is a diagram of a data replication failure management system, according to an example embodiment.

FIG. 4 is a diagram of a data replication failure management system 400, according to an example embodiment. The data replication failure management system 400 is implemented in a machine-accessible and readable medium is accessible over a network. The network may be wired, wireless, or a combination of wired and wireless. In an embodiment, the data replication failure management system 400 implements various aspects associated with the method 100 of the FIG. 1.

The data replication failure management system 400 includes a monitor service 401 and a shard disk 402. Each of these and their interactions with one another will now be discussed in detail.

The monitor service 401 is implemented in a machine-accessible and readable medium and is to process on a machine of the network; the machine associated with a first node. Example processing associated with the monitor service 401 was presented above with reference to the method 100 of the FIG. 1.

The monitor service 401 dynamically and in real time keeps track of replication services that process on the at least one additional node and writes information to the shared disk 402 when a particular node fails that permits that particular node to resynchronize with other nodes when the particular node recovers from a failure situation.

In an embodiment, the monitor service 401 records write messages in a particular partition or with particular identifying information within the shared disk 402. The write messages are associated with non failing nodes and their write activity while the particular node is in the failure situation. The particular partition or the particular identifying information permits the particular node to identify the write messages and replay them when the particular node recovers.

In yet another embodiment, the monitor service 401 maintains a bitmap in the shared disk 402 that identifies blocks that non failing nodes modified while the particular node was in the failure situation. The particular node uses the bitmap recorded in the shared disk 402 to synchronize with the non failing nodes when the particular node recovers.

In other situations, the monitor service 401 clears any attempted write to the shared disk 402 that does not complete successfully and which was attempted by the particular node before it encountered the failure situation. Additionally, the monitor service 401 releases a write lock associated with the attempted write.

The storage disk 402 is implemented as a device that is accessible to the first node over a network connection and that is accessible to at least one additional node. Various aspects of the storage 402 were discussed above with reference to the system 300 of the FIG. 3.

It is now appreciated how a shared resource can be integrated into a replication process to enhance and improve failure recovery and improve read processing.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
acquiring a write lock on a first node;
writing blocks associated with the write lock to one or more local disks of the first node;
simultaneously writing the blocks associated with the write lock to a shared disk over a wide-area network connection, the shared disk is shared with a second node and the first node, and the first node and second node are replicated with one another via the shared disk that is accessed by the first node and the second node over the wide-area network connection, the shared disk is on a particular node that is independent of the first node and the second node, the blocks associated with the write lock are also written to the second node, furthermore writes to the shared disk, the first node and the second node occur when there are no failures, each write operation made to either the first node or the second node results in N+1 writes where N represents an integer for a total number of nodes replicated and the addition of one represents the shared node;
providing profile information that identifies an alternative shared disk for automatic usage when the shared disk becomes unresponsive and the alternative shared disk is also replicated with the shared disk; and
releasing the write lock after the writing of the blocks to the one or more local disks of the first node and the writing of the blocks to the shared disk have completed.

2. The method of claim 1 further comprising:
acquiring a read lock;
serving a read request associated with the read lock from the one or more local disks; and
releasing the read lock after the read request is served.

3. The method of claim 1 further comprising:
determining that the shared disk is unresponsive; and
automatically switching to the alternative shared disk to communicate with for subsequent write locks.

4. The method of claim 1 further comprising:
determining that the shared disk is unresponsive; and
failing processing associated with subsequent write locks and subsequent read locks on the first node while the shared disk remains unresponsive.

5. The method of claim 1 further comprising:
acquiring a bitmap from the shared disk after recovering from a failure situation on the first node; and
using the bitmap to determine which blocks have to be updated and from which other nodes to acquire the blocks in order to update the first node after the failure situation.

6. The method of claim 1 further comprising, replaying a shared data log from the shared disk after recovering from a failure situation on the first node in order to update the first node after the failure situation.

7. The method of claim 1, wherein acquiring further includes hooking onto an Input/Output (I/O) path of the first node.

8. A method, comprising:
monitoring progress of synchronization between two or more nodes that are replicas and synchronized with one another;
detecting a failure in a particular node while a write was attempting to take place but does not complete, and the write was being attempted to a shared disk associated with the two or more nodes, the shared disk on a different node that is independent of the particular node and the two or more nodes and the shared disk accessible over a wide-area network connection to the particular node and the two or more nodes, the shared disk is being used for managing multi-node replication for the particular node and the two or more nodes and the shared disk is independent of the particular node and the two or more nodes, and profile information identifies an alternative shared disk to the shared disk for use when the shared disk fails and the alternative shared disk is replicated with the shared disk; and
clearing a log in the shared disk associated with a partial write associated with the attempted write to ensure that there is no indication of the attempted write in the log, the two or more nodes including the particular node communicate with the shared disk and the particular node knows when the write fails when the particular node recovers because the particular node will not see any indication of the write when it comes back online based on the cleared log missing any indication of the write.

9. The method of claim 8 further comprising, releasing a write lock associated with the attempted write and held by the particular node, the write lock held by the particular node when a failure situation occurs on the particular node before the particular node can process the write.

10. The method of claim 8 further comprising:
detecting a different failure with the particular node associated with a read lock, the particular node having the read lock that was unprocessed when the different failure occurred; and
clearing each additional read lock held by the particular node.

11. The method of claim 8 further comprising:
detecting a different failure with the particular node, wherein a particular write completes successfully to the shared disk before the different failure is detected; and
updating each of the two or more nodes that did not fail with the write from the shared disk.

12. The method of claim 8 further comprising, writing subsequent writes made by the non failing ones of the two or more nodes after the particular node fails to an area of the shared disk associated with the particular node thereby permitting the particular node to replay the subsequent writes when the particular node recovers.

13. The method of claim 8 further comprising, populating a bitmap to identify blocks that were updated while the particular node is in a failure situation on the shared disk thereby permitting the particular node to resynchronize with those blocks from the non failing ones of the two or more nodes when the particular node recovers.

14. The method of claim 8, processing the method as a service executing in a processing environment associated with a non failing one of the two or more nodes or associated with the shared disk.

15. A system, comprising:
a replication service implemented in a machine-accessible and readable medium and to process on a machine associated with a first node; and
a shared disk implemented as a device accessible to the first node over a wide-area network connection and locally accessible to a different machine associated with a second node, the second node is independent of the first node and a third node;
the replication service is to keep a first local disk associated with the first node synchronized with a third local disk associated with the third node by acquiring write locks for writes and performing the writes against the first local disk and communicating the writes to the shared disk via the wide-area network connection and then releasing the write locks, the shared disk including tracking and audit information that also includes identity information for resources that make the writes on the first local disk and the third local disk, each write operation performed against the first local disk, the shared disk, and the third local disk, the shared disk for managing replication between the first local disk and the third local disk, the shared disk replicated with an alternative shared disk and the alternative shared disk identified via profile information.

16. The system of claim 15, wherein the shared disk includes a designated partitioned area accessible to the first node and a different designated partitioned area accessible to the third node thereby permitting the first node and the third node to communicate information without waiting on one another.

17. The system of claim 16, wherein the replication service communicates the writes to the designated area accessible to the first node on the shared disk.

18. The system of claim 15, wherein the replication service simultaneously performs the writes against the first local disk while communicating the writes to the shared disk.

19. The system of claim 15, wherein the replication service acquires a read lock and services data associated with a read request and the read lock from the first local disk and then releases the read lock.

20. A system, comprising:
a monitor service implemented in a machine-accessible and readable medium and to process on a machine associated with a first node; and
a shared disk implemented as a device accessible to the first node over a wide-area network connection and accessible to at least one additional node, the at least one addition node is independent of the first node and a particular node;
the monitor service is to dynamically and in real time keep track of replication services that process on the at least one additional node and writes information to the shared disk when the particular node fails that permits the particular node to synchronize with the at least one additional node when the particular node recovers from a failure situation, the particular node and the at least one additional node dynamically communicate with the monitor service and the monitor service keeps the shared disked updated with the write information, and wherein each write operation is performed on the particular node, the at least one additional node, and the shared disk, profile information provides identification to the monitor service of an alternative shared disk for usage when the shared disk fails and the alternative shared disk is replicated with the shared disk.

21. The system of claim 20, wherein the monitor service records write messages in a particular partition or with particular identifying information within the shared disk, the write messages associated non failing nodes and their write activity while the particular node is in the failure situation and the particular partition or the particular identifying information permits the particular node to identity the write messages and replay then when the particular node recovers.

22. The system of claim 20, wherein the monitor service maintains a bitmap in the shared disk that identifies blocks that non failing nodes modified while the particular node was in the failure situation, and wherein the particular node uses the bitmap recorded in the shared disk to synchronize with the non failing nodes when the particular node recovers.

23. The system of claim 20, wherein the monitor service clears any attempted write to the shared disk that does not complete successfully, which was attempted by the particular node and releases a write lock associated with the attempted write.

* * * * *